(12) United States Patent
Hopman et al.

(10) Patent No.: US 7,400,247 B2
(45) Date of Patent: Jul. 15, 2008

(54) ASSET SEAL DEVICE AND METHOD

(75) Inventors: Nicholas C. Hopman, Lake Zurich, IL (US); Steven R. Flatt, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 257 days.

(21) Appl. No.: 11/267,240

(22) Filed: Nov. 4, 2005

(65) Prior Publication Data

US 2007/0103310 A1    May 10, 2007

(51) Int. Cl.
*G08B 13/14* (2006.01)
*G08B 13/08* (2006.01)

(52) U.S. Cl. ............... 340/545.2; 340/572.7; 340/572.8

(58) Field of Classification Search ......... 340/541–567, 340/568.1–572.9, 545.2, 545.4, 545.6, 572.7, 340/572.8; 73/761; 343/720
See application file for complete search history.

(56) References Cited

U.S. PATENT DOCUMENTS

| | | | |
|---|---|---|---|
| 6,069,563 A * | 5/2000 | Kadner et al. ............... 340/571 |
| 6,265,973 B1 * | 7/2001 | Brammall et al. ......... 340/568.1 |
| 7,042,354 B2 * | 5/2006 | Auerbach et al. ...... 340/539.31 |
| 7,042,357 B2 * | 5/2006 | Girvin et al. ............. 340/568.2 |
| 7,218,232 B2 * | 5/2007 | DiSilvestro et al. ...... 340/572.8 |
| 2003/0075608 A1 * | 4/2003 | Atherton ...................... 235/492 |
| 2003/0173408 A1 * | 9/2003 | Mosher et al. ............... 235/492 |
| 2005/0263602 A1 * | 12/2005 | Lin et al. ..................... 235/492 |
| 2006/0123917 A1 * | 6/2006 | Kibblewhite .................. 73/761 |
| 2006/0145868 A1 * | 7/2006 | Chen et al. ............... 340/572.8 |
| 2006/0145870 A1 * | 7/2006 | Coveley et al. .......... 340/572.8 |
| 2006/0232408 A1 * | 10/2006 | Nycz et al. ............... 340/572.1 |
| 2006/0290497 A1 * | 12/2006 | Sugata ...................... 340/572.1 |

FOREIGN PATENT DOCUMENTS

DK    10056473 C1 *    1/2002

* cited by examiner

*Primary Examiner*—George A Bugg
*Assistant Examiner*—Jennifer Mehmood

(57) ABSTRACT

A device and method of sealing a container comprises a mechanical bolt (201') with a circuit disposed thereon. The circuit includes RFID function. When a captivating device (203) is joined with one end of the bolt (201') the RFID circuit changes state and operates to transmit symbolic data. When the bolt is severed or cut off the RFID circuit again changes state and operates to transmit other symbolic data.

18 Claims, 6 Drawing Sheets

ASSET SEAL DEVICE AND METHOD

FIELD OF THE INVENTION

This invention is generally directed to the field of asset tracking and in particular to the field of electronic seals.

BACKGROUND OF THE INVENTION

Commercial shipping operations include movement of cargo using intermodal containers. A substantial amount of world cargo transport is completed using these intermodal containers. Presently cargo security is a major concern. One simple means to assure that cargo is shipped intact is to use a seal to secure the doors on a container. The concept here is that if the seal was put in place by a trusted source at an origin location, and it remains intact at an intended destination location that the cargo is intact and in fact safe. Prior art includes many types of mechanical seals. One problem with these mechanical seals is that they require manual inspection which is relatively expensive, inconvenient and slows down transport. Electronic seals using Radio Frequency Identification (RFID) technology are also available but are prohibitively costly and moreover complicated to use because operators need to be retrained to use this new technology. Also electronic seals are bulky devices because they contain relatively large antenna structures. As a result benefits of electronic seals, including readability while cargo is in motion, have not been realized.

What the intermodal container transport industry needs is an electronic seal that is simple to use without changing operator convention.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

Figure 1:
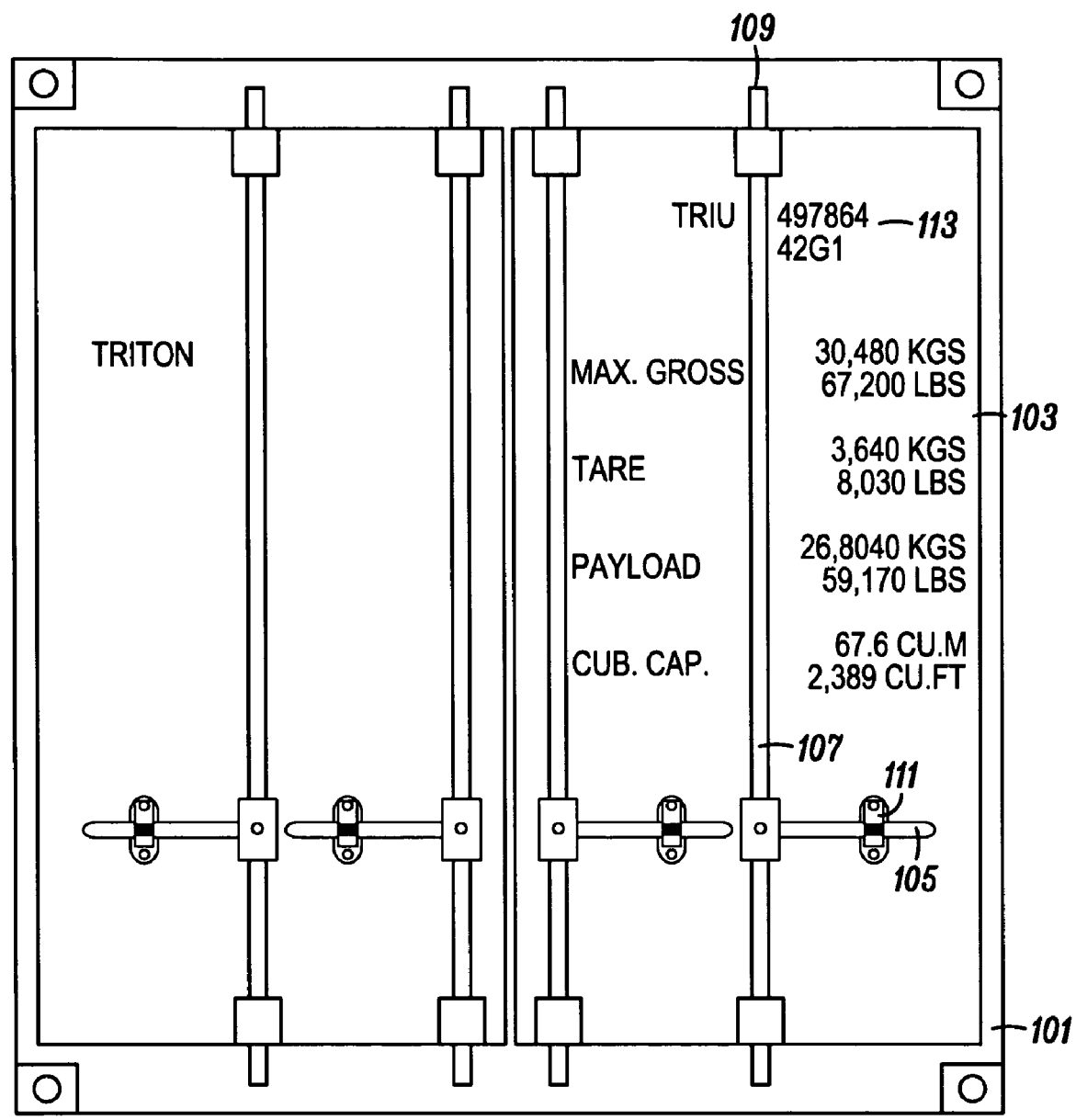
FIG. 1 is a diagram of a rear door of an intermodal container.

Before describing in detail embodiments that are in accordance with the present invention, it should be observed that the embodiments reside primarily in combinations of method steps and apparatus components related to methods and apparatus for electronic seals. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments. The structure described below overcomes the deficiencies of the prior art by providing an electronic seal that looks, feels, and is installed like a conventional mechanical bolt seal.

FIG. 1 is a diagram of a rear door of an intermodal container. Intermodal containers are largely defined by the International Organization for Standardization (ISO). A rear door assembly 101, includes a door 103 opened and closed using handles 105 each connected to a lock shaft 107 connected to a locking mechanism 109. Note that the handle 105 is captivated by a lock hasp 111. A seal mechanism is typically inserted into the hasp 111 to prevent the handle 105 from being used to open the door 103. Note also that the container is identified by a unique license plate number 113 in accordance with an ISO standard.

Figure 2:
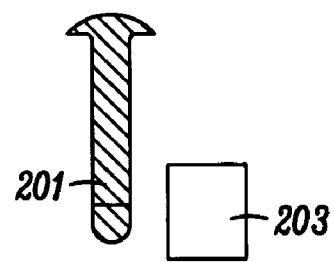
FIG. 2 is an illustration of a conventional bolt seal for sealing an intermodal container.

FIG. 2 is an illustration of a conventional bolt seal for sealing an intermodal container. There are many variations on bolt seals but the device is very common. The bolt seal comprises a bolt 201 and a captivating portion 203. Note that the captivating portion 203 typically has a unique serial number identifier (not shown) that is used by various entities in the transportation system.

Figure 3:
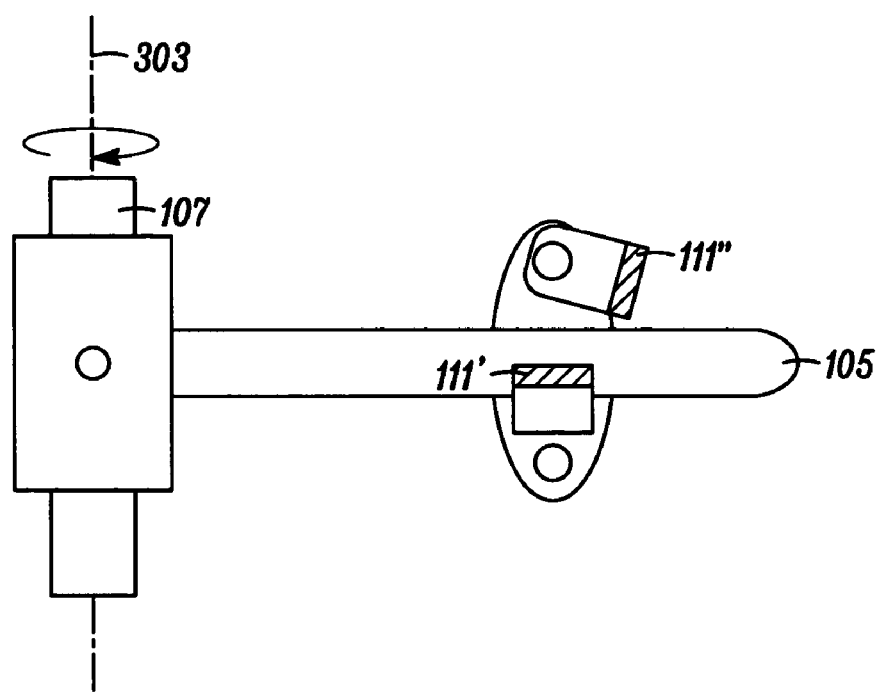
FIG. 3 is a detailed view showing operation of a door opening mechanism on an intermodal container.

Next, operation of a door opening mechanism on an intermodal container is described in FIG. 3. A lower hasp mechanism 111' cradles the handle 105. To open the container door an upper hasp mechanism 111" is rotated allowing the handle 105 to be lifted up from the lower hasp mechanism 111'. Once the handle 105 is lifted sufficiently an operator pulls the handle 105 away from the container door causing the lock shaft 107 to rotate about an axis 303. After sufficient rotation the locking mechanism 109 shown in FIG. 1 is opened allowing the door 103 to be opened. In practice both handles shown in FIG. 1 associated with the door 103 must be used to open the door 103.

Figure 4:
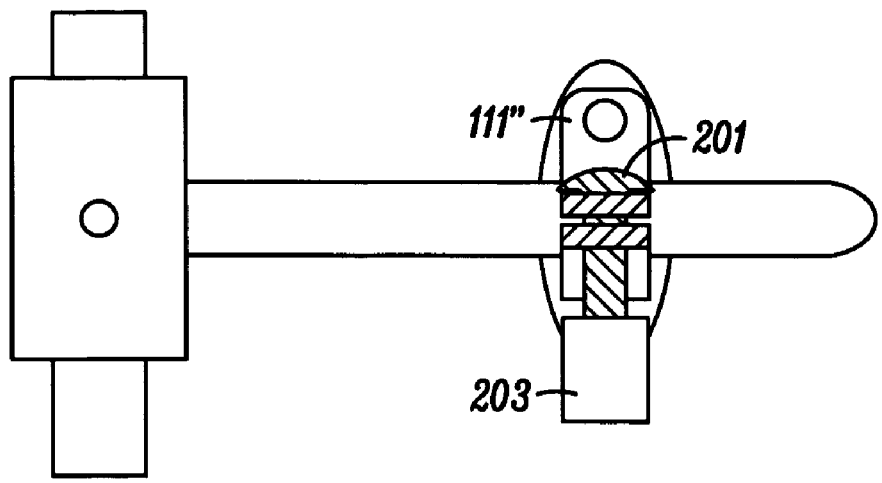
FIG. 4 shows a conventional bolt seal sealing a door opening mechanism on an intermodal container.

Referring now to FIG. 4 the bolt 201 is inserted through the upper hasp mechanism 111", the lower hasp mechanism 111' and captivated by the captivating portion 203. The container door 103 shown in FIG. 1 is now sealed. Both the head of the bolt 201 and the breadth of the captivating portion 203 do not allow the removal of the bolt seal. To remove the seal one must use a bolt cutter or other equivalent device to sever the bolt allowing it to be removed from the upper hasp mechanism 111" and the lower hasp mechanism 111'.

Figure 5:
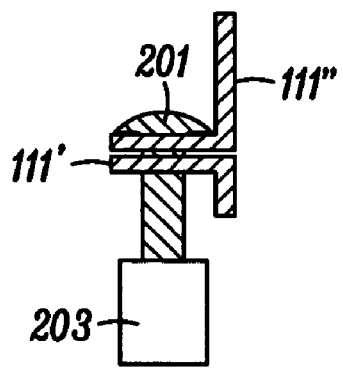
FIG. 5 illustrates a different view of the mechanism shown in FIG. 4.

FIG. 5 illustrates a different view of the mechanism shown in FIG. 4. Again the bolt 201 is inserted through the upper hasp mechanism 111", the lower hasp mechanism 111' and captivated by the captivating portion 203.

FIG. 1 through FIG. 5 illustrate industry convention. Various embodiments illustrating the improved device and method will be detailed next.

Figure 6:
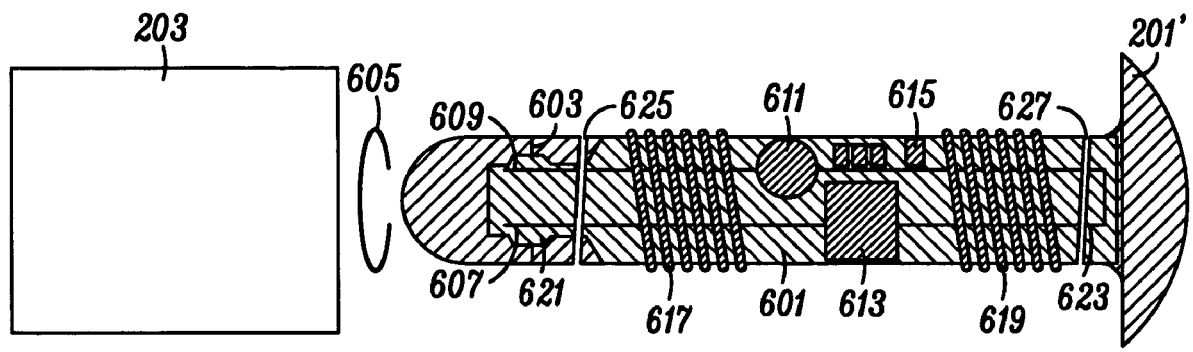
FIG. 6 shows an electronic seal in accordance with an embodiment of the invention.

FIG. 6 shows an electronic seal in accordance with one embodiment of the invention. A bolt 201' serves as the base material for hosting electronic components on a substrate 601 along a longitudinal surface of the bolt 201'. However, skilled artisans will realize that in other embodiments, electronic components may be disposed along other surfaces of the bolt 201' such as, for instance, in the head of the bolt 201'. The bolt 201' can be made of many different materials but here is a conventional steel material. The bolt 201' has a captivation feature 603 disposed thereon for locking an electrically conductive article 605 and permanently affixing the captivating portion 203 onto the bolt 201'. Article 605 is shown apart from the captivating portion 203 for clarity of operation only. However, article 605 is typically captivated within the captivating portion 203. Those of ordinary skill in the art will readily recognize many other functionally equivalent means for permanently affixing the captivating portion 203 onto the bolt 201'.

Turning now to the substrate and associated components and elements, substrate 601 is in one embodiment made of a standard FR4 printed circuit board material or a polyimide or other flexible substrate. Of course other suitable materials may be used. In this embodiment shown in FIG. 6, components affixed to the substrate 601 comprise a battery 611, an integrated circuit 613, and other electrical components 615. These other electrical components 615 can include a magnetic wakeup circuit. Circuit traces 607 and 609 are also disposed longitudinally on substrate 601 and extend into a portion 621 of the substrate 601. One key principal here to recognize is that because the article 605 is electrically conductive, circuit traces 607 and 609 that are disposed on the substrate 601 are electrically connected upon the captivation feature 603 engagably locking the article 605. In this arrangement, circuit traces 607 and 609 form a plurality of electrically separated conductors arranged at one end of the circuit substrate 601. Moreover, the action of onserting the captivating portion 203 to the bolt 201' activates the electronic seal. The seal then commences operation. There are only two traces 607 and 609 shown in the embodiment illustrated. However, those of ordinary skill in the art will realize that additional traces may be used in other embodiments.

Figure 10:
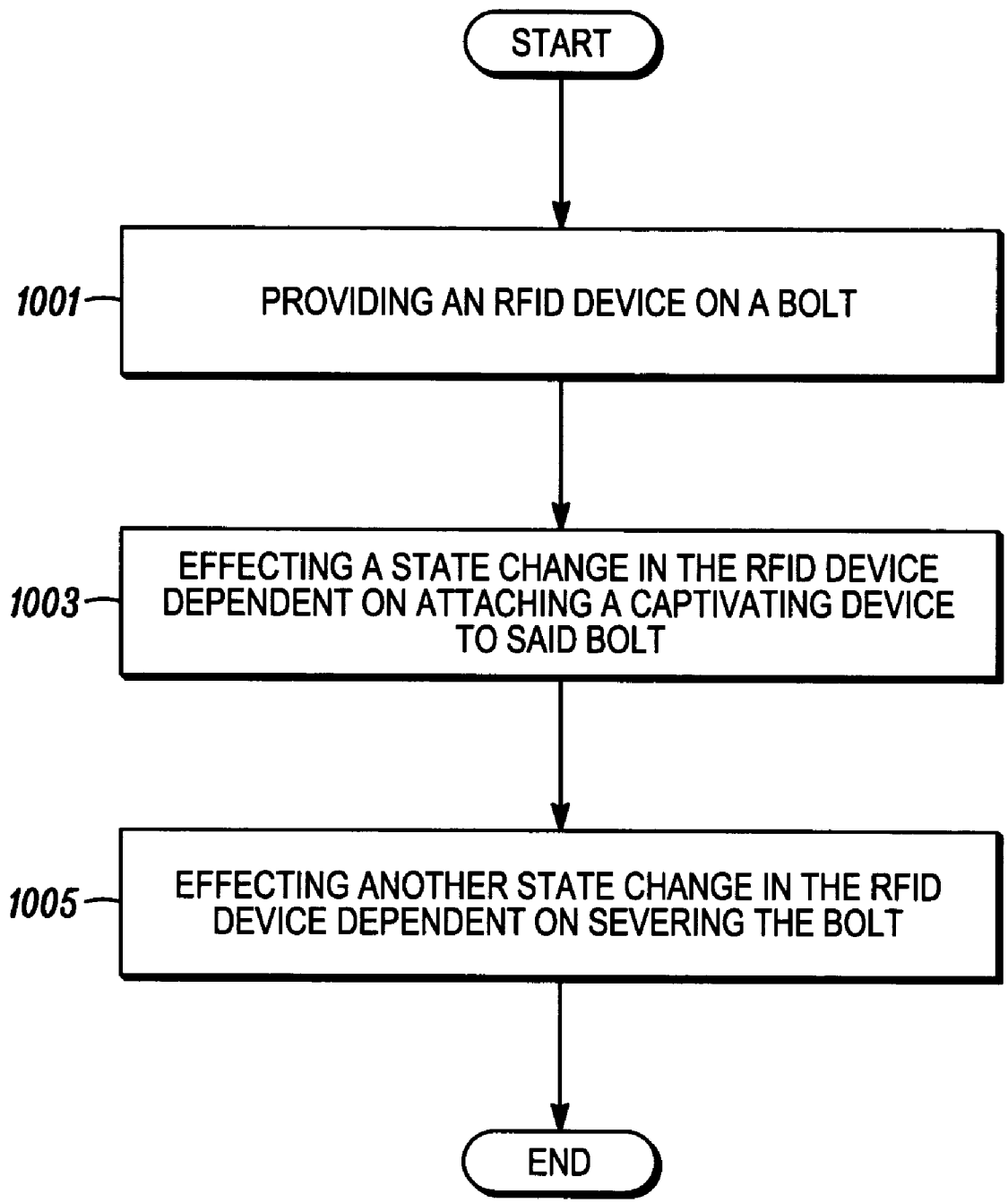
FIG. 10 illustrates a flow diagram describing an asset sealing method in accordance with an embodiment of the invention.

Referring briefly to FIG. 10, it illustrates a flow diagram describing an asset sealing method in accordance with an embodiment of the invention. The components 611-615 provided for on the bolt 201' form an active radio frequency identification device (RFID) (step 1001) and are arranged to sense the electrical connection of circuit traces 607 and 609 and to change a state of the RFID device based on this sensing, when the captivating device 203 is attached to bolt 201' (step 1003). This change of state may cause commencement of beaconing a unique identification symbol using antenna elements 617 and 619. In one embodiment, other information—such as the seal state, here "closed" of the device—is transmitted as well. Also information such as time of closure can be transmitted. Many other functional operations are possible as well. For example after electrical connection of circuit traces 607 and 609, the RFID device can also remain dormant until an external stimulus is received via the antenna elements 617 and 619. If the external stimulus is received by the RFID device then it can start transmitting the unique identification symbol for a period of time. Those of ordinary skill of the art will readily recognize many other useful RFID functions. RFID readers (not depicted here) can sense the transmissions and pass them onto other external systems to monitor the seal-state of the container.

In this embodiment, the substrate 601 is at least partially wrapped around the cylindrical geometry of bolt 201'. This feature is shown at reference number 621. Since the shorting device, article 605, is circular this enables more convenient conformance around the captivation feature 603. The antenna elements 617 and 619 are correspondingly wrapped helically around the cylindrical bolt 201'. By doing this the emitted radio frequency (RF) energy is emitted in all directions rather than in a single direction. Of course other antenna arrangements can be used to achieve a substantially similar result. Antenna elements 617 and 619 can be constructed of conventional copper wire, printed or otherwise deposited conductive elements, flexible circuit substrates, or other equivalent means.

When a cutting device is used to remove the bolt 201' it also cuts through the circuit traces 607 and 609 (shown by reference number 625) if cut proximate the captivating portion 203, which affects another state change in the RFID device, e.g., seal state is "opened" (step 1005 of FIG. 10). Alternatively the cutting device can be used to cut through another circuit trace positioned 623 distal the captivating portion 203. In either case the RFID circuit senses this and either stops transmitting the unique identification symbol and seal state, or transmits that the seal state is "opened".

To finish the device a protective overcoat can be applied except for the circuit traces 607 and 609. One such coating is Polyamide or other nylon based material which can be easily over molded. This over molding will protect the device from harsh chemical environments such as salt water experienced by intermodal containers during overseas transit.

Figure 7:
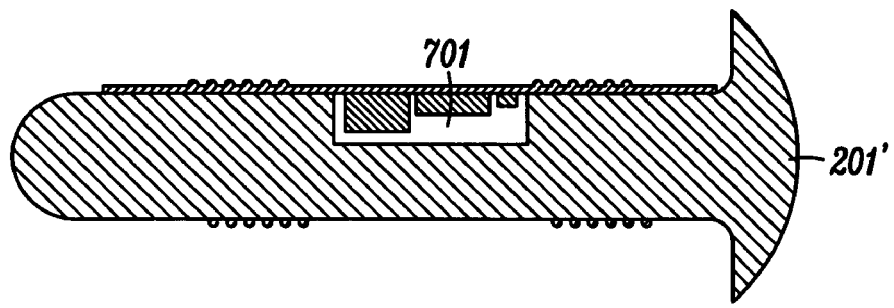
FIG. 7 is a diagram illustrating a cross sectional view of the article introduced in FIG. 6.

FIG. 7 is a diagram illustrating a cross sectional view of the article introduced in FIG. 6. Here the RFID components 611-615 are shown positioned coaxially within the bolts 201' external extents in a slot 701 removed from the bolt's cylindrical geometry. This is a useful arrangement because the earlier described upper and lower hasp mechanisms 111" and 111' have openings of a slightly larger diameter than the diameter of the bolt 201'. So by containing the RFID components essentially within the outer extent of the bolt diameter the described device can still be threaded through the conventional hasp elements. Once over molded the bolt looks and works like a conventional mechanical bolt seal with a protective coating disposed thereon.

Figure 8:
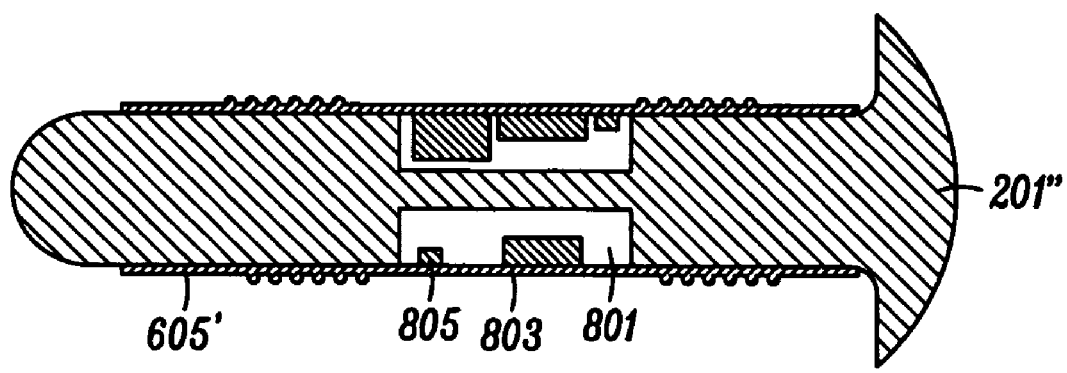
FIG. 8 shows an electronic seal in accordance with another embodiment of the invention.

FIG. 8 shows cross sectional view of an electronic seal in accordance with another embodiment of the invention. In this case another slot 801 is removed from the bolt's cylindrical geometry to create a second area for housing additional electronic components 803 and 805. Circuit substrate 605' is extended at least partially around the bolt 201" to host the additional circuit elements. Since the bolt diameter is constrained and the bolt length is also constrained (to make it harder to bend of illicitly), adding more space for circuitry enables more function to be contained within the extents of the cylindrical bolt.

Figure 9:
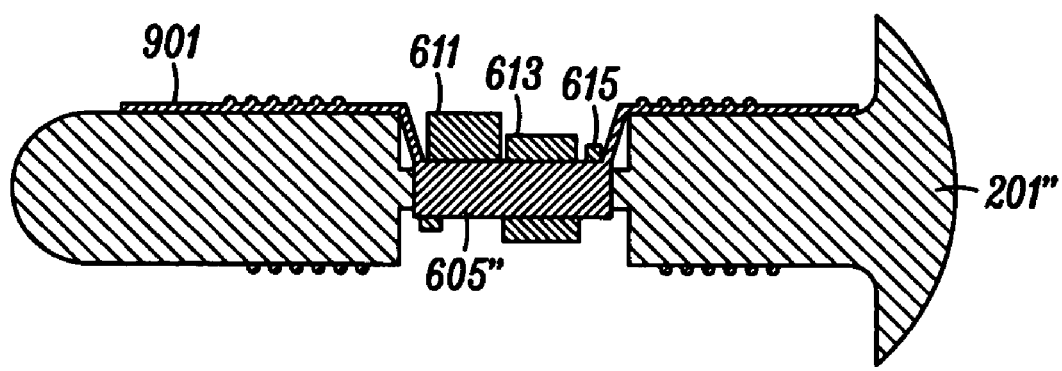
FIG. 9 illustrates an electronic seal in accordance with another embodiment of the invention.

In FIG. 9 a cross sectional view of another embodiment of the invention includes adapting the circuit elements including the circuit substrate 605" to the surface of the bolt. In this case the circuit substrate 605" is wrapped around a rectangular portion of the bolt. The height of the components 611-615 are constrained to be within the external extents of bolt 201" to better enable the bolt 201" to be inserted through conventional hasp elements without damaging these components.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, the terms "comprises," "comprising", "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A device comprising:
   a bolt having a longitudinal surface;
   a circuit substrate disposed onto the bolt;
   an antenna disposed on the bolt;
   a conductor disposed along the longitudinal surface of the bolt; and
   an RFID circuit disposed onto the circuit substrate and coupled to the conductor wherein affixing the bolt within a captivation device completes an electrical circuit with the conductor, thereby allowing the RFID circuit to transmit a first state, and wherein a cutting of the bolt will cut through the conductor and break the electrical circuit allowing the RFID circuit to transmit a second state.

2. A device in accordance with claim 1 wherein the RFID circuit is an active RFID circuit.

3. A device in accordance with claim 1 wherein the one end of the circuit substrate associated with the plurality of electrically separated conductors is disposed conforming to a cylindrical geometry of the bolt.

4. A device in accordance with claim 1 wherein the RFID circuit is disposed contained coaxially within the outer extents of the cylindrical geometry of the bolt.

5. A device in accordance with claim 4 wherein the RFID circuit comprises a battery.

6. A device in accordance with claim 1 further comprising an antenna coupled to the RFID circuit.

7. A device in accordance with claim 6 wherein the antenna is arranged helically surrounding the bolt.

8. A device in accordance with claim 1, wherein the surface along which the circuit substrate is disposed is a longitudinal surface of the bolt.

9. A device in accordance with claim 1, wherein the plurality of electrically separated conductors comprises a plurality of electrically separated circuit traces.

10. A device in accordance with claim 9, wherein the plurality of circuit traces comprises two electrically separated circuit traces.

11. A device in accordance with claim 9 further comprising another circuit trace positioned distal the one end of the circuit substrate associated with the plurality of electrically separated circuit traces.

12. An asset sealing method comprising the steps of:
   providing an RFID device on a bolt;
   providing an antenna on the bolt, the antenna coupled to the RFID device;
   providing a conductor on a longitudinal surface of the bolt, the conductor coupled to the RFID device;
   effecting a first state change in the RFID device dependent on attaching a captivating device to said bolt wherein the RFID device completes a circuit with the conductor;
   transmitting the first state by the antenna; and
   effecting a second state change by a cutting of the conductor; and
   transmitting the second state by the antenna.

13. A method in accordance with claim 12 further comprising a step of transmitting symbolic data dependent on the step of effecting a state change.

14. A method in accordance with claim 12 further comprising a step of effecting another state change dependant on cutting the bolt.

15. A method in accordance with claim 12 further comprising a step of transmitting other symbolic data dependent on the step of effecting another state change.

16. A method of signaling whether an asset is secured by a bolt within a captivation device, comprising:
   placing an RFID device, disposed on the bolt, in a first state by completing a circuit with a trace extending longitudinally along the bolt when the bolt is placed within the captivation device;
   transmitting a signal indicating the first state by an antenna on the bolt;
   placing the RFID device in a second state should the trace be subsequently broken while at least a portion of the bolt remains positioned within the captivation device; and
   transmitting a signal indicating the second state by an antenna on the bolt.

17. The method of claim 16 further comprising transmitting the state of the RFID device by an antenna coupled to the RFID device and disposed on the bolt.

18. The method of claim 16 further comprising transmitting the state of the RFID device by an antenna coupled to the RFID device and disposed helically surrounding the bolt.

* * * * *